United States Patent
Rodger

[11] 3,844,171
[45] Oct. 29, 1974

[54] LIGHT GUIDE LIQUID LEVEL INDICATOR

[76] Inventor: Erwin S. Rodger, 41 Maple Ave., Locust Valley, N.Y. 11560

[22] Filed: Dec. 29, 1971

[21] Appl. No.: 213,589

[52] U.S. Cl. .................................. 73/293, 350/96 B
[51] Int. Cl. ............................................ G01f 23/02
[58] Field of Search............ 73/293; 340/380, 244 R; 240/8.4; 116/118 R; 350/112, 96 B, 286; 356/134, 137, 136

[56] References Cited
UNITED STATES PATENTS

| | | | |
|---|---|---|---|
| 1,811,946 | 6/1931 | LeBailly | 73/293 |
| 2,240,988 | 5/1941 | Hertel | 73/293 |
| 2,350,712 | 6/1944 | Barsties | 73/293 |
| 2,483,102 | 9/1949 | Pierson | 356/134 |
| 3,120,125 | 2/1964 | Vasel | 73/293 |
| 3,498,141 | 3/1970 | Nelson et al. | 116/118 R X |
| 3,553,666 | 1/1971 | Melone | 73/293 |
| 3,569,933 | 3/1971 | Longenecker et al. | 240/8.4 X |
| 3,713,338 | 1/1973 | Kind | 73/293 |

FOREIGN PATENTS OR APPLICATIONS

| | | | |
|---|---|---|---|
| 1,223,769 | 3/1971 | Great Britain | 73/293 |
| 398,945 | 4/1932 | Great Britain | 73/293 |

*Primary Examiner*—James J. Gill
*Assistant Examiner*—Daniel M. Yasich
*Attorney, Agent, or Firm*—Leonard H. King

[57] ABSTRACT

A liquid level indicator having a probe which is inserted within a container holding the liquid, and an external readout device. The probe contains a vertical prism and pairs of light guides spaced at preselected levels along the prism. One of each pair of light guides directs light to the prism and the other of the pair receives light passing through the prism and transmits it to the readout device. The light guides are spaced from the prism. When the prism is in air, the light entering the prism is internally reflected and no light reaches the receiving light guides. When the prism is in a liquid, light passes through the prism to the receiving light guides and an indicator is turned on at the readout device.

13 Claims, 15 Drawing Figures

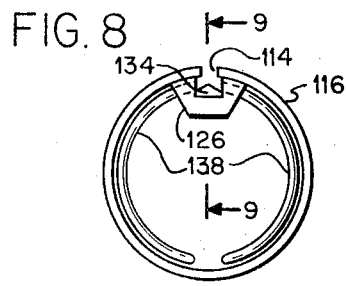
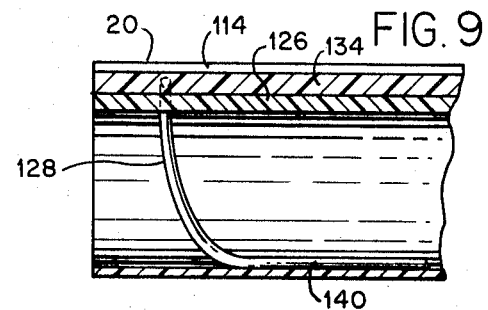
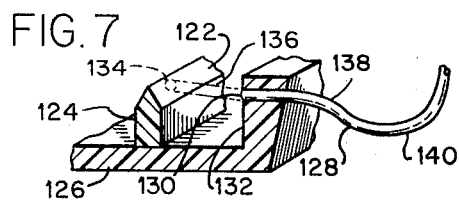
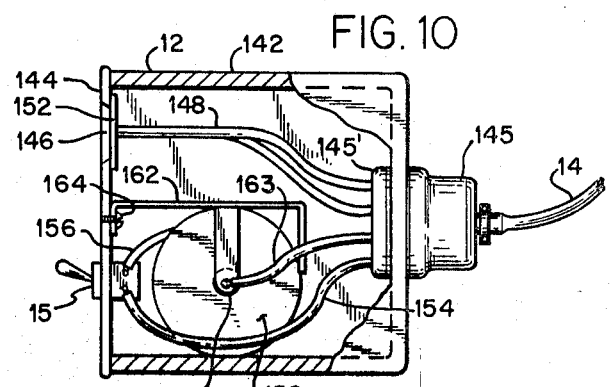
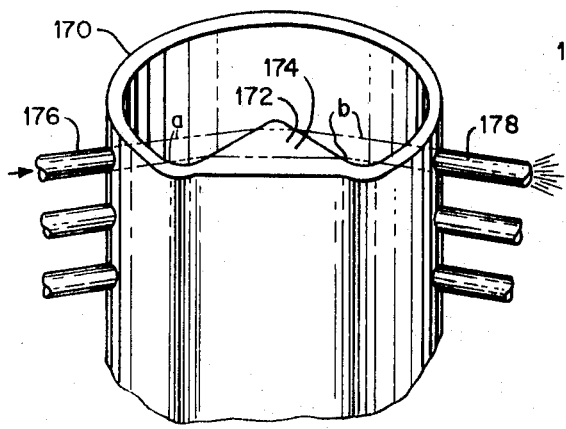
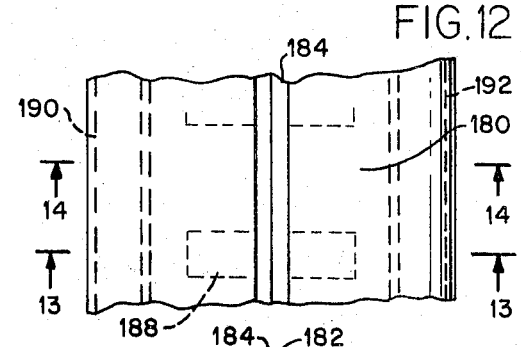
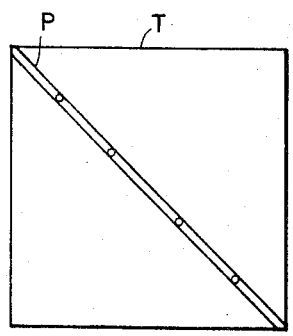
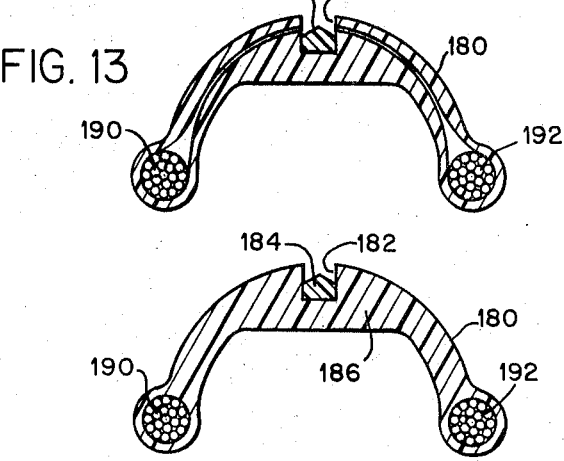

LIGHT GUIDE LIQUID LEVEL INDICATOR

The above mentioned Abstract is neither intended to define the invention of the application which, of course, is measured by the claims, nor is it intended to be limiting as to the scope of the invention in any way.

This invention relates to a device for sensing and indicating the level of liquids in a container, and more particularly for sensing by means of a plurality of transilluminators light passing through a vertical prism inserted in the liquid.

BACKGROUND OF THE INVENTION

As is well known in the art, the index of refraction of liquids differs from that of air. Accordingly, light passing through a boundary between a surface and air, will refract at a different angle from light passing through the boundary between the surface and a liquid. Based upon the different light reactions due to the change of index of refraction, numerous liquid level determining devices have been known in the prior art. Some of these devices use an external light source which is focused on an entire container having some liquid therein and measures the light passing through the container on its opposite side. Other devices send a beam of light into the container of liquid through a vertical tube inserted therein and the amount of light reflected back to the source is an indication of the liquid level. Yet other devices make use of a plurality of prisms inserted at various levels in the container. For example, U.S. Pat. No. 3,120,125 employs a plurality of such prisms, each inserted at a specified height within the container. The prisms are each placed with their bases in a plane parallel to the surface level of the liquid. Light is passed by means of a transilluminator onto one face of each of the prisms. When the prism is in an air medium, the light will pass through that face into the prism, will be totally reflected off the base and will exit from the opposite face where it is detected by another transilluminator. If the prism is in a liquid medium, the light will pass from the illuminated face into the prism and will pass through the base of the prism directly into the liquid medium. Accordingly, no light will be reflected from the opposite face of the prism when it is in the liquid. In order to insure proper operation, the transilluminators will be placed directly abutting the surface of the prism.

When using the prior art devices, and specifically the one heretofore described, the output is read by optically sensing the termination end of each of the transilluminators. Should light be received by the receiving transilluminator, its termination end will be illuminated. Accordingly, an illuminated transilluminator termination end is an indication of the absence of a liquid.

The prior art devices, and specifically the heretofore mentioned patent, require expensive installation in that a plurality of individual prisms are required since each prism has its base parallel to the liquid surface. Furthermore, droplets of the liquid clinging to the bottom of the prism from a previous reading, can diminish or stop the reflection when the prism is subsequently in an air medium, thereby giving false readings. In addition, since indication of the liquid level is provided when a particular transilluminator is dark, a burned out bulb or a broken transilluminator, which would give a dark indication, would be misinterpreted as an indication of the liquid level. A further problem is that a sloshing liquid which might be instantaneously passing above or below the base of the prism, would give spurious readings and an inadequate indication. Furthermore, because the transilluminators must abut the prism, should the transilluminator for some reason become loose and removed from the prism, false readings will be obtained.

It is, therefore, an object of this invention to provide a liquid level indicating device which avoids the aforesaid problems of the prior art.

A further object of the invention is to provide a liquid level indicating device making use of optical principles.

Still a further object of the invention is to provide a liquid level indicating device employing a vertical prism having its base perpendicular to the surface of the liquid.

Yet a further object of the invention is to provide a liquid level indicating device making use of light passing through a prism wherein the liquid level is read on a plurality of indicator lights such that the lights turn on as the liquid level increases.

A still further object of the invention is to provide a liquid level indicating device employing light passing through a prism wherein the light is carried to and removed from the prism surfaces by means of transilluminators such as fiber optic bundles.

A further object of the invention is to provide a liquid level indicating device which can determine the boundary level between two liquids in a container.

Yet a further object of the invention is to provide a liquid level indicating device employing a vertical prism inserted into a container at least partially filled with a liquid and wherein light transmitted to and removed therefrom by means of transilluminators pass through both the liquid or air medium as well as the prism.

A further object of the invention is to provide a liquid level indicating device wherein sloshing of the liquid is damped out by the sensing device so hat the readout is an indication of the average level of the liquid.

A still further object of the invention is to provide a liquid level indicating device having a sensing probe which can be inserted into a container holding liquid and a readout device connected to the sensing probe by means of electrical wires and or transilluminating fibers.

A further object of the invention is to provide a liquid level indicating device having a sensing probe for holding a vertical prism and a plurality of transilluminators such as fiber optic bundles wherein a large radius of curvature is provided in the probe to avoid tangential light loss within the transilluminators.

A still further object of the invention is to provide a simple, inexpensive, easily serviceable and clearly readable liquid level indicating device.

SUMMARY OF THE INVENTION

Briefly, the invention includes a sensing probe insertable into a cylinder for holding liquid, and a readout device coupled to the sensing probe. The sensing probe contains a vertical prism having its base perpendicular to the surface of the liquid. A first set of transilluminating devices are vertically spaced from each other within the probe and positioned adjacent one face of the vertical prism. A second set of transilluminating devices are similarly vertically spaced from each other within the probe and positioned adjacent the opposite face of the prism, each one of the transilluminating devices of the second set associated with one of the first set. Both sets are slightly spaced from the face of the prism itself. Light is passed through the first set of transilluminating devices. When the prism is in an air medium, the light leaving the first set of transilluminating devices passes through the air and into the first face of the vertical prism. Because of the index of refraction of the boundary between the prism and the air, the light is totally reflected within the prism so that no light is received by the second set of transilluminating devices facing the opposite face of the prism. When the prism is in a liquid which has a higher index of refraction than air, the light from the first set of transilluminating devices passes through the liquid and the prism.

The prism and transilluminator device is constructed such that the light ray's angle of incidence upon the second face of exiting surface of the prism is less than the "critical angle" when the device is immersed in a liquid having an index of refraction greater than air.

When light impinges upon the exiting surface of the prism at an angle greater than the critical angle, as when in air, total internal reflection occurs and no light exits from the second face or existing surface of the prism. When the incidence angle is less than the critical angle, as when in a liquid, light exits from the second prism surface and is picked up by a second transilluminator. The critical and incidence angles are measured from the normals to the surfaces and their magnitudes are readily found using Snell's Law. The light leaving will be detected by the second set of transilluminating devices.

The termination ends of the second set of transilluminating devices are located in the readout device. The illumination of the ends of the transilluminating devices provide an indication of the presence of liquid in the container. The number of devices which are illuminated indicates optically the level of the liquid in the container. A source of light is included within the probe which provides the source of illumination for the first set of transilluminating devices. Since the light passes through the medium of air or liquid before entering into the prism, it is possible to add a color to the liquid such that the readout device can provide a color coded output to indicate the interface between various liquids contained within the same container. The probe is constructed to give a maximum radius of curvature for the transilluminating devices over the longest distance by using a compound curved shape or double curve arrangement for the transilluminators thereby minimizing the tangential light loss within them. A shield can be included around the probe unit to dampen the effect of liquid sloshing, thereby providing that the readout device will be an average value of liquid level.

The above-mentioned objects, together with further objects, features and advantages of the invention will, in part, be pointed out with particularity and will, in part, become obvious from the following more detailed description of the invention taken into conjunction with the accompanying figures which form an integral part thereof.

BRIEF DESCRIPTION OF THE DRAWING

FIG. 7 is a sectional isometric view of part of the probe unit of the present invention;

FIG. 8 is an end view of the probe unit of the present invention;

FIG. 9 is a sectional view of the probe unit taken along line 9 — 9 of FIG. 8;

FIG. 10 is a side elevational view of one embodiment of the readout device having one end thereof removed;

FIG. 11 is an isometric view of part of a sensing probe in accordance with another embodiment of this invention;

FIG. 12 is a cut-away elevational view of the sensing probe in accordance with yet another embodiment of this invention;

FIGS. 13 and 14 are sectional end views of the embodiment shown in FIG. 12 and taken along lines 1 — A and lines B — B, respectively; and FIG. 15 is a schematic showing of a sensing probe positioned in a tank wherein the probe has a length greater than the tank depth.

DETAILED DESCRIPTION OF THE INVENTION

Figure 1:
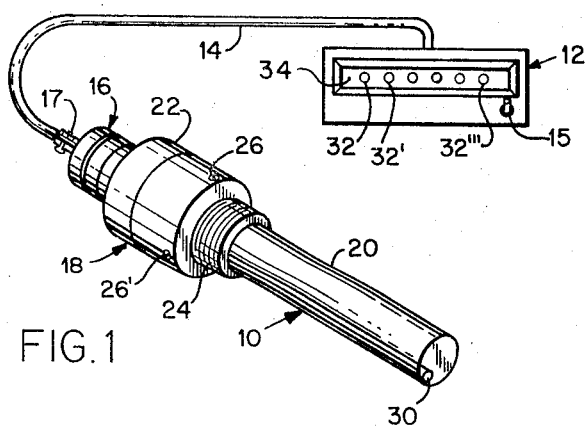
FIG. 1 is an isometric view of the liquid level indicating device in accordance with this invention.

Referring now to FIG. 1, there is shown one embodiment of this invention comprising a sensing probe unit shown generally at 10 and a readout unit shown generally at 12 interconnected by means of coupling lines 14 which include the fiber optics and the electric wires. The probe unit 10 includes a connector end 16 which holds the coupling lines 14 by means of a clamp 17. The connector end 16 clamps into a middle section 18 which holds the sensing device 20 which axially extends therefrom. The sensing device is a hollow tube which is constructed from glass or plastic.

The middle section 18 may typically have one end thereof knurled 22 for ease of manipulating and holding. The other end thereof may have a screw thread 24 to permit connecting the probe unit to a holder which can be permanently attached to the top of the container holding the liquid. Set screws 26, 26' are used to retain the sensing device 20 within the middle section 18. The sensing device 20 has a plurality of transilluminting devices such as small light conducting fibers bundled together. These bundles are spaced along the axial length of the sensing device 20 as will herinafter be described. A vertical prism 30 extending along the axial length of the sensing unit is located along the periphery thereof.

The readout unit 12 includes a main switch 15 for turning on the device and a plurality of indicator bulbs 32, 32' . . . 32''' spaced along the readout in a recessed section thereof 34.

Figure 2:
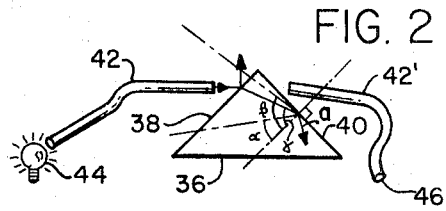
FIGS. 2 - 4 show pictorial drawings useful for explaining the theory of operation of the device of the present invention.
Figure 3:
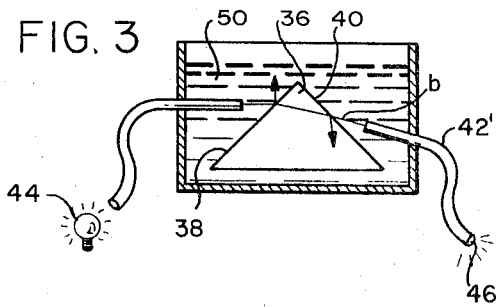
Figure 4:
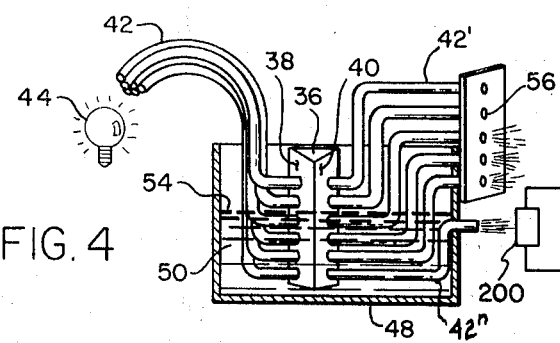

Referring now to FIGS. 2 - 4, there will be explained a theoretical understanding of the present invention. FIG. 2 shows a prism 36 having a first face 38 and a second face 40. Transilluminators such as light guides 42, 42', are spaced adjacent the respective faces 38, 40. A source of illumination 44 is located at the commencement of light guide 42 so that light is transmitted through the light guide to the face 38 of the prism. Accordingly, at the face of the prism, the boundary includes air and the material of the prism, typically glass or Lucite. Due to the respective indices of refraction, part of the light will be reflected at the surface of the prism while most of the light will penetrate into the prism.

Thus, as shown in FIG. 2, the light entering the prism at face 38 will be refracted such that when it reaches face 40 it will make an angle $\gamma$ with the perpendicular to face 40. As is known from Snell's Law, light will only emit from a surface if the angle of incidence is less than the critical angle which is defined as the angle between the incident beam of light and the perpendicular to the surface of incidence. As is shown in FIG. 2, the critical angle for the prism in air is $\alpha$. Since the angle of incidence $\gamma$ is greater than $\alpha$, the light will be totally reflected within the prism as shown by the path "a" so that no light leaves the prism from surface 40. Therefore, light guide 42' will not receive any illumination and its termination end 46 will not be illuminated.

FIG. 3 shows the identical prism 36 now placed within a container 48 having a liquid 50. The light from the illuminating source 44 will pass through the light guide 42 to the face 38. The critical angle with the prism immersed in liquid is greater than when the prism is in air. Typically, the critical angle would be angle $\beta$ (FIG. 2) which is greater than the critical angle in air, $\alpha$. The light from source 44 entering the prism at face 38 makes an angle $\gamma$ with face 40. However, with the prism in the liquid, the angle of incidence $\gamma$ is less than the critical angle $\beta$ and the light will pass through face 40 as shown by path "b." The light will be received by light guide 42' which will transmit the light to its termination point 46 which will then be illuminated. It can, therefore, be seen by comparing FIGS. 2 and 3 that merely by placing the same device from an air medium to a liquid medium causes the termination end 46 to become illuminated. It is noted that the path of light into and out of the prism is through the faces thereof; at no time is the light passed through the base of the prism.

Referring to FIG. 4, there is shown a liquid level indicator using a vertical prism 40 mounted within the container 48 having a liquid 50 at a height 54 such that part of the prism is submerged within the liquid. A plurality of light guides 42 are connected in spaced relationship adjacent one face 38 of the prism 52. The origin of the light guides 42 is illuminated by the light source 44. The second group of light guides 42' are similarly vertically spaced apart, adjacent the opposite face 40 of the vertical prism 40 and have their termination ends 46 connected to liquid level readout 56. The termination of each light guide 42' can be provided with a rough finish or unpolished surface to permit broad angle viewing, or the end of the light guide 42' can itself be highly polished to provide an optical readout of the illumination. Those light guides 42' immersed within the liquid will receive illumination from the face of the prism 40 as explained with regard to FIG. 3. Those light guides out of the liquid and in the air medium will not receive illumination as was described with regard to FIG. 2. Accordingly, as is shown in FIG. 4, the lower three light guides being immersed in the liquid will provide illumination at readout 56. The top two light guides, not immersed in the liquid, will be dark. A viewer looking at the readout 56 will be able to determine level 54 of the liquid 50 by noting the number of indicator bulbs which are illuminated.

The prism is generally constructed of glass, synthetic resin such as polymethylmethacrylate or other material with a suitable index of refraction through which light can be passed. The transilluminating devices can be constructed of any light conducting material such as glass, polymethylmethacrylate or the like, but are preferably constructed of a plurality of elongated, relatively thin, light conducting fibers which are bundled together and attached in side-by-side relationship with each other. Preferably, the fibers should be lined up one upon the other in a vertical row. The type of liquids that can be used with the particular device include any liquid which has a higher index of refraction than does air. For some liquids with an index of refraction greatly different it might be necessary to alter the angle at which the transilluminating devices face the prism to insure that light will pass through the prism when immersed in the liquid. However, the relationship of the angles of entry to the boundary in the respective indices of refraction are well known and can be determined with principles known in the art.

Figure 6:
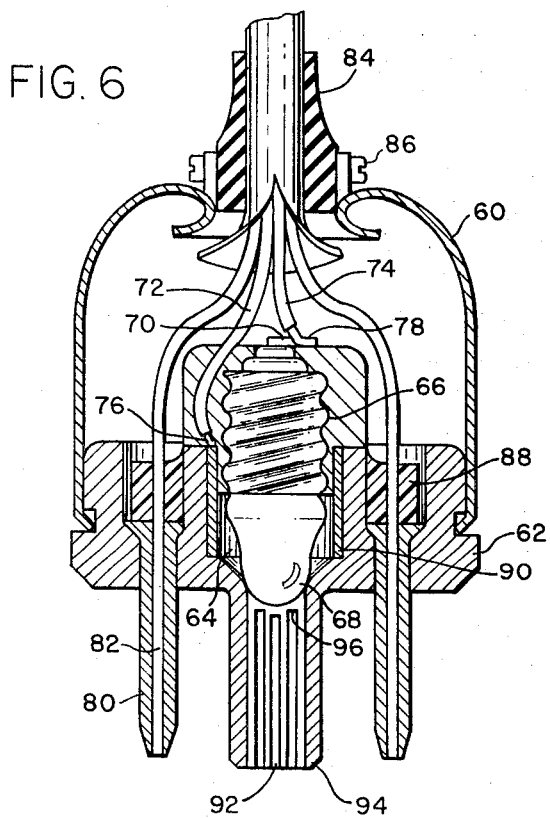
FIG. 6 shows a sectional elevational view of one embodiment of the connector used at the end of the probe unit shown in FIG. 5.
Figure 5:
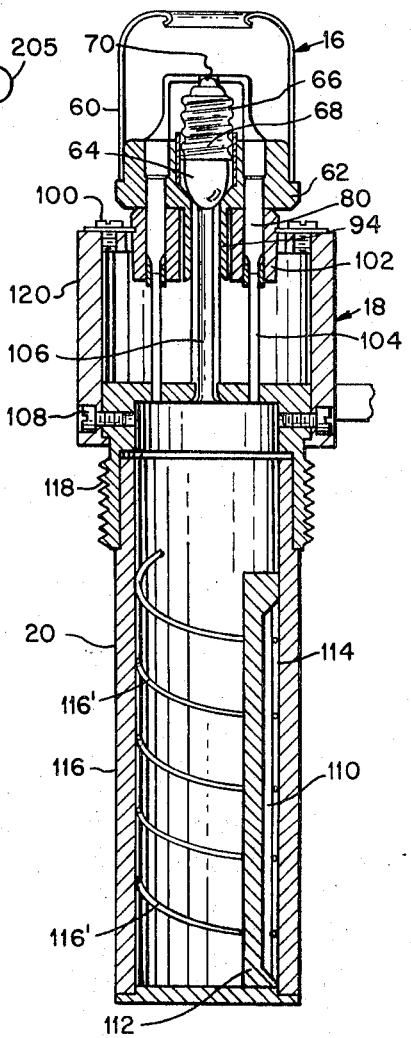
FIG. 5 is a sectional elevational view of one embodiment of the probe unit of the present invention.

Referring now to FIG. 5, there is shown an elevational sectioned view taken through the center of the probe unit shown in FIG. 1. The probe unit comprises three sections as heretofore described. The connector end 16, the middle section 18 and the sensing device 20. The connector end 16, which is shown in more detail in FIG. 6, is a modified octol socket comprising a shell 60 which snugly fits over a base section 62. The base is drilled out (64) and the upper part of it is threaded (66) with a conductive material such that a bulb 68 can be screwed thereinto. A further conductor 70 is placed at the upper tip of the bulb base. Electric wires 72, 74, which enter through the upper end of the connector, are connected, respectively, to the metallic thread at 76 and the upper contact at 78.

A plurality of prongs 80 extend from the connector 16 and are tapped to permit passage of the fiber optics 82 therethrough. The fiber optics 82 pass through the top of the connector 16, through a cable clamp 84 which is securably connected to the connector 16 by means of the screw 86. The prongs 80 are secured into the base of the socket by means of securing plugs 88. Optical insulation means 90 is located around the illuminated portion of the bulb 68. A plurality of fiber optics 92 are located within a center prong 94 such that their ends 96 can receive the illumination from the bulb 68 as is seen in FIG. 6.

Referring again to FIG. 5, the connector 16 is inserted into the middle section 18 and is held therein by means of the prongs 80, 94. The peripheral prongs 80 securably fit into a plate 102 placed in the top of the intermediary section 18 and held by screws 100. The center prong 94 fits within the plate 102. The fiber optics 82 pass through the peripheral sections 104 and the illuminated fiber optics 92 pass through the center passageway 106. The middle section 18 fits over and is connected to the lower sensing device 20 by means of set be transparent. 108. The sensing device 20 is a hollow tube constructed of Lucite, glass or the like and holds the prism 110 mounted on a retaining member 112 and located adjacent a notch 114 longitudinally cutting a section of the wall 116 of the tube. Part of the middle section is shown as having an external thread thereon 118 to permit attaching the probe unit into a holding device on the container for permanent connection. The middle section is also shown as having a knurled portion 120 to permit holding an manipulating of the probe unit. The tube need not betransparent. The fiber optics continue from the upper section in a semicircular arrangement around the tube. Some of these are shown at 116'.

Referring now to FIG. 7, there is shown a partially sectioned schematic view of the prism and fiber optics included within the sensing device of the probe. The prism 122 rests on a base holding section 124 which is supported by a channel 126. In the walls of the channel are placed circumferentially extending holes through which the fiber optic 128 is inserted. (See FIGS. 8 and 9). The end 130 of the fiber optic is located adjacent the surface 132 of the channel 126. The fiber optic 128 is directed such that the beam of light 134 radiating therefrom images on to face 130 along axial line 136.

The fiber optic 128 contains a double curve arrangement extending away from the channel 126 outwardly through a sensing device. The curve includes a first portion 138 which extends in an approximate semicircle immediately from the holding-member 126 and a second portion 140 further upstream which continues from the first curve and approximates a "J" as the fiber optic extends through the longitudinal part of the sensing device 20. The double curve provides maximum radius of curvature over the distance thereby minimizing the tangential light loss which would result from sharp angular curves.

Referring to FIGS. 8 and 9, there is shown, respectively, an end view and a sectional view taken along line 9 — 9 of the sensing device 20. As shown in FIG. 8, the sensing device comprises a hollow tube 116 having a longitudinal notch therethrough 114 at which point is mounted a holding member 126 having a longitudinally extending prism 134 attached thereto and extending into the notch 114. Fiber optics 128 and 128' pass through the holding member 126 with their ends adjacent to the opposite faces of the prism and extend outwardly therefrom circumferentially around the interior periphery of the sensing device. The first curved portion 138 occurs as the fiber optics leave the holding section 126.

Referring to FIG. 9, there can be seen the fiber optic 128 and the second curved section 140 as the fiber optic turns laterally away from the prism 126 and extends through the sensing device 20.

Referring now to FIG. 10, there is shown one embodiment of the readout unit shown in FIG. 1. The unit comprises a case 142 having a cover 144 securably connected thereto. A plug 145 is removably inserted into the back of the case. The plug 145 has prongs outwardly extending therefrom (not shown) each of which contains a fiber optic from the probe unit 10 which is transmitted through coupling 14 and held by end clamp 147. The prongs are inserted into and received by a member 145' placed on the inside of the case 142. The fiber optics 148 connected from the plug 145 are each terminated at an end which abuts an opaque surface 152 placed on the inside of cover 144 having a cut out 146 arranged in front of the glass to form a recessed section permitting the viewing of the end of the fiber optic member. A switch 15 extending through the cover 144 has two electric leads connected thereto. One lead 154 is connected directly to the plug 145 through the connecting member 145'. The other lead 156 is connected to one end of battery 158 whose other end 160 is connected through lead 163 to the connector 145. The battery is held in place by means of the clamp 162 securably attached to the cover 144 by means of the screw 164.

It will be seen from the heretofore described FIG. 10 in conjunction with FIGS. 1 and 6, that when switch 14 is turned on, the battery 158 is interconnected to the bulb 66 located in the probe unit 10, through the cable 14. The illuminated bulb 66 sends light through the light guides 92 to the prism. The portion of the prism in the liquid will pass the light through the prism which will be detected by the light guides 82 and transmitted back through the inter-connecting cable 14 to the indicator bulbs 150 for illumination.

Referring now to FIG. 11, there is shown another embodiment of the sensing device including the prism and light guide section. As is shown, the sensing device includes a hollow tube 170, made of clar plastics or glass and having a triangular prism section 172 which may be extruded integrally therewith. If desired, a cylindrical tube may be reformed with an indentation and filled with a clear plastic 174, whose index of refraction is approximately equal to that of the glass or plastics tube placed within the indented section to equivalently form a prism. The light guides 176 which carry light towards the prism and light guides 178 which remove the light from the prism, are all placed within the walls of the glass tube 170. The light paths are shown by entering path A and the leaving path B. Light will only be transmitted through section 174 to be detected by light guides 178 when that portion of the tube 170 is inserted within a liquid as was heretofore described.

Referring now to FIGS. 12 through 14, there is shown yet a further embodiment of the sensing device showing the prism in conjunction with the light guides. As is seen from these figures, the sensing device comprises a semi-circular member 180, having a longitudinal notch in the center thereof 182, in which is inserted a prism 184. The prism extends vertically through the member and abuts a holding section 186. Cut-out portions 188 are located laterally along the holding section 186. One end of the semi-circular section 190 is formed as a hollow tube through which a first plurality of light pipes pass. A second tube-like section 192 is similarly placed on the other end of the circumferential section through which a second plurality of light pipes pass. In the vicinity of the cut-outs 188 light pipes from both pluralities extend from the two tube-like sections 190, 192, inward, peripherally along the inside circumference of member 180 towards the notched section 182 and terminate adjacent the faces of the prism 184. The operation of this embodiment is similar to that heretofore explained.

Although there has been shown in the above described embodiments a single vertical prism which extends throughout the length of the sensing device, it is understood that a plurality of smaller prisms could similarly be used as long as the prisms are placed such that the base plane is perpendicular to the surface level of the liquid in the container. Should two liquids, which are not soluble with each other, be used in the same container, it is possible to determine the boundary level between the two liquids by placing colors into each of the liquids. Since the light which passes from the light guides to the prism, passes through the liquid prior to and after passing through the prism, the color of the light at the readout will be affected by the color contained within the liquid. The indicating bulbs at the readout device would, therefore, show different colors whereby the crossover between the change of colors of the indicator bulbs would indicate the boundary level between the two liquids.

In FIG. 15 there is shown a sensing probe P positioned at an angle in tank T. It will be appreciated that this probe being longer than the depth of the tank is positioned at an angle whereby the sensing elements are distributed proportionately to the depth of the tank and can provide a proper reading if calibrated in terms of tank portions.

Since a vertical prism is used, wherein the light passes through the faces and not through the base, both surfaces of which are perpendicular to the liquid level, liquid which adheres to the prism will drain off from the surfaces whereby the device will be unaffected by suds or droplets clinging to the prism.

It is possible to place a protective cover around the entire sensing device 20 which would cover the notch section as well as the entire tube, with the end of the tube being open and uncovered. The protective cover would avoid inadequate readings resulting from sloshing of the liquid, since it would have a dampening effect on the sloshing. Since the slot is opened at the bottom, only the average level of the liquid would be measured.

A low level detection arrangement is shown in FIG. 4 where a light sensing element 203, such as a photo diode or a photo resistor, is positioned at the end of a fiber optic element 42n. As the level of the liquid falls below the level of the fiber optic element, light is received by the sensing element $42^n$. This causes a change in current from source 202 in detection means 203. The detection means could be, by way of example, a relay, trigger or gating circuit which controls a visible alarm such as a light 205 or an audible alarm.

Although at each station along the sensing tube there has been shown only a single fiber optic, as is known, various transilluminating devices could be be Preferably a plurality of fibers could be arranged in an intimate bundle and grouped linearly along the axis of the prism to pick up more light at the output as the light axially spreads.

There has been disclosed heretofore the best embodiment of the invention presently contemplated. However, it is to be understood that various changes and modifications may e made by those skilled in the art without departing from the spirit of the invention.

What I claim as new and desire to secure by Letters Patent is:

1. A liquid level indicating device, including probe means capable of being inserted into a container holding a liquid, and readout means external from and coupled to said probe means, said probe means comprising:

prism means having first and second elongated faces and a base;

support means defined by a hollow tube including an outer wall and having a longitudinally extending notch in its wall, said notch extending through substantially the entire length of the tube, and wherein said prism means is positioned within said tube such that the apex formed at the junction of said first and second faces outwardly abuts said notch;

a first plurality of elongated transilluminators secured to said support means in longitudinally spaced relation with each other, said first plurality of transilluminators having their originating ends arranged to the illuminated by a source of light and their terminating ends adjacent to but spaced from said first face of said prism, said first plurality of transilluminators each being positioned on said support means to focus the light transmitted therethrough onto the surface of said first face along a line substantially parallel with said base;

a second plurality of transilluminators secured to said support means in longitudinal spaced relation with each other, said second plurality of transilluminators having their originating ends adjacent to but spaced from said second face of said prism and generally in opposition to said terminating ends of said first plurality of transilluminators, said second plurality of transilluminators being positioned on said support means to receive light transmitted through said second face of said prism and having their terminating ends coupled to said readout means; and said readout means comprising illuminating means coupled to said terminating ends of said second plurality of transilluminators for providing an optical display output of illuminated terminating ends, wherein light is transmitted through said second face on that portion of said prism means which is inserted within the liquid thereby providing an optical display output, and wherein light is not transmitted through said second face of that portion of said prism means which is not within the liquid thereby not providing an optical display output.

2. A liquid level indicating device as in claim 1, wherein said first and second faces and said base each lie respectively in planes substantially perpendicular to the average surface level of the liquid.

3. A liquid level indicating device as in claim 1 wherein each of the transilluminators has a double curve arrangement, a first curve of which approximates a semicircle and continues into the second curve which approximates a J.

4. A liquid level indicating device as in Claim 1 and further including retaining means located on the interior of said hollow tube having a longitudinal channel cut therein forming side walls and a back defining the channel and having a plurality of transverse bores longitudinally spaced along both the side walls defining the channel, the base of said prism being mounted along the back defining said channel, and said first and second plurality of transilluminators positioned respectively in the transverse bores on both walls defining the channel.

5. A liquid level indicating device as in claim 1 wherein said probe means further comprises connecting means removably attached to said support means and containing that source of light.

6. A liquid level indicating device as in claim 5 wherein said connecting means is a plug having prongs extending therefrom, said support means further includes socket means for receiving said prongs, and wherein said first and second plurality of transilluminators pass through said prongs.

7. A liquid level indicating device as in claim 1 wherein said support means and said prism means are constructed of transparent synthetic resin.

8. A liquid level indicating device as in claim 1 wherein said transilluminators are bundles of fiber optics.

9. A liquid level indicating device as in claim 1 wherein said readout means further comprises a source of electrical energy for energizing the source of light, and switch means connected in series with said source of electrical energy.

10. A liquid level indicating device as in claim 1 and wherein said support means further includes cover means circumferentially enclosing said hollow tube except for an end portion of said tube which remains exposed.

11. A liquid level indicating device as in claim 1 wherein said support means is a longitudinal tube having a longitudinal inwardly pointed V notch integral therewith, and wherein said prism means is formed by means filling in said V notch.

12. A liquid level indicating device as in claim 1 wherein said support means is a longitudinal semi-circular member having hollow tubes at the edges of the semi-circle and having a longitudinal notch at the approximate midpoint thereof extending longitudinally through almost the entire length thereof, said prism positioned adjacent said notch, and said first and second pluralities of transilluminators respectively passing through said hollow tubes.

13. A light responsive, liquid level indicating device for displaying the level of the liquid in a container, said indicating device comprising:
   a. a readout device external from the container and including a plurality of light responsive indicating means representing different, predetermined liquid levels, each said indicating means having an on state and an off state, the on state of each said indicating means being indicative of the presence of liquid in the container at the predetermined level associated therewith and the off state of each said indicating means being indicative of the absence of liquid in the container at the predetermined level associated therewith;
   b. a prism having an elongated, input surface and an elongated, output surface and a base;
   c. support means for positioning said prism in the liquid within the container whereby said elongated surfaces span the different, predetermined liquid levels; and
   d. a plurality of pairs of elongaged transilluminators mounted on said support means in a plurality of substantially horizontal planes that correspond to the predetermined liquid levels with one end of each of the pairs of said transilluminators being located adjacent to but spaced apart from said elongated input and output surfaces of said prism, the other ends of said transilluminator pairs being, respectively, in communication with a source of light and said indicating means, said support means positioning said pairs of transilluminators in vertical spaced relationship along the height of said prism whereby light transmitted by the light source travels through one transilluminator of each said pair and enters said input surface along a line that is substantially parallel with the plane of said base, and on that portion of said prism positioned below the liquid level, the light entering said input surface of said prism passes through said output surface thereof through the other transilluminator of each pair and to said indicating means of said readout device, and on that portion of said prism that is above the level of the liquid, light entering said input surface is internally reflected within said prism such that no light passes through said output surface thereof.

* * * * *